April 22, 1952 F. PAVELKA 2,593,915
ELECTROOSMOTIC APPARATUS
Filed June 8, 1948

INVENTOR.
FEDERICO PAVELKA
BY
ATTORNEY

Patented Apr. 22, 1952

2,593,915

UNITED STATES PATENT OFFICE 2,593,915

ELECTROOSMOTIC APPARATUS

Federico Pavelka, Milan, Italy

Application June 8, 1948, Serial No. 31,741
In Austria June 27, 1947

2 Claims. (Cl. 204—257)

The invention relates to an electro-osmotic cell for the purification of aqueous liquids, such as particularly water.

As commonly known, the ions present in salt solutions move in conformity with their ionic characteristics under the influence of an electric field either to the cathode or to the anode. Moreover, certain ions may be separated from solutions, baths and the like by means of electro-osmotic cells. The purification of water is often carried-out in this manner at a small expense; as a rule these cells consist of an anode, a cathode and at least one, but usually more, diaphragms which separate the anode and the cathode.

The electrodes and diaphragms used in these cells usually have the shape of a flat sheet and the cells have a prismatic configuration.

The disadvantage of these known electro-osmotic cell constructions consists therein that the prismatic outer vessel cannot be used as an electrode and that an unfavorable utilization of the disposable cell space results due to the creation of unused corners.

It is the main object of this invention to eliminate this deficiency.

Generally, it is not possible to electro-osmotically treat and purify liquids in a single cell device and a succession of cells is therefore customarily used for this purpose; therefore, the solutions to be treated pass through a plurality of successive cells.

The pipes connecting these cells must be made of an electrically insulating material and must also have a sufficient rigidity. Materials answering these requirements such as glass, hard rubber are, however, easily breakable. Therefore, guarding means, for instance screens, must be used to protect the tubes.

It is an object of the invention to eliminate this disadvantage by a novel location and shape of the various insulated pipes used in connection with my invention.

Figure 2:
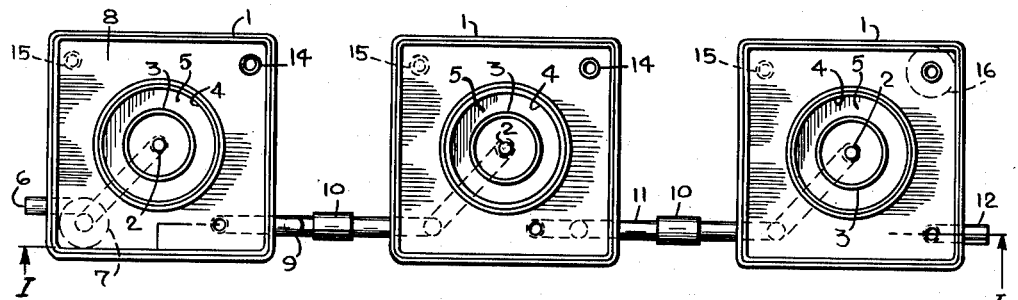
Figure 1:
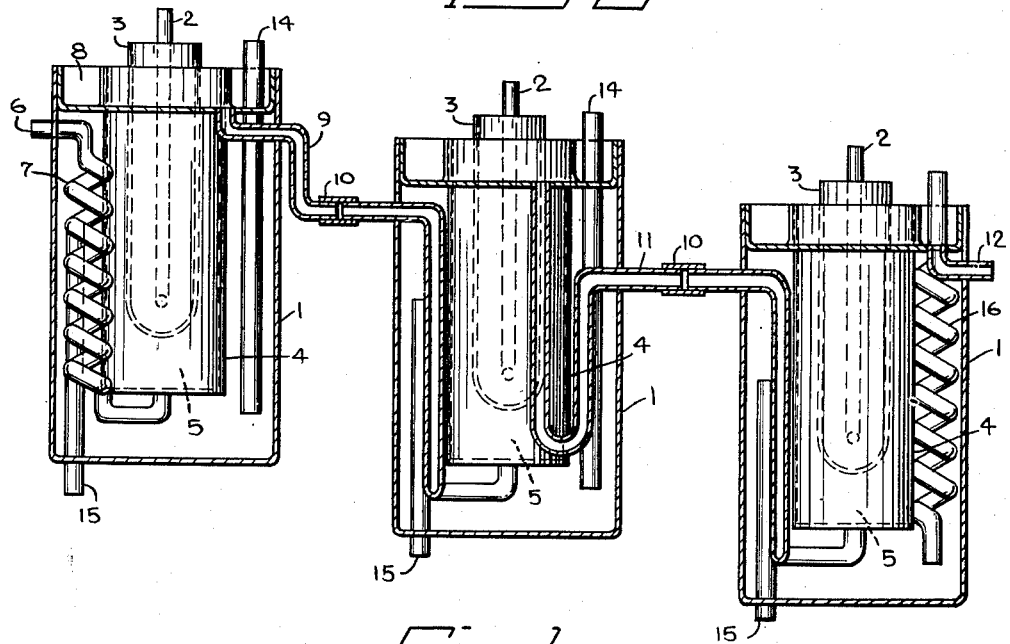

A preferred embodiment of the same is illustrated in the attached drawings where Fig. 1 is a schematic vertical view partly in section of a three-cell plant for the purification of water on line I to I of Fig. 2; and Fig. 2 is a plan view of the same.

In the drawing, numeral 1 denotes an outer quadrangular cathode, numeral 2 denotes an anode, numeral 3 a circular anode diaphragm and 4 a circular cathode diaphragm.

The diaphragms enclose an inner circular treatment chamber 5; the cathode 1 encases an outer quadrangular cathode chamber and diaphragm 3 an inner circular anode chamber.

The aqueous solution to be purified enters through tube 6 and flows through the helical portion 7 thereof into the circular treatment chamber 5 of the first cell.

From here, the solution passes through an overflow passage 8 and a pipe 9 into the treatment chamber of the second cell, the pipe being located in a corner of said cathode chamber. The pipe 9 consists of two portions which are connected by a sleeve 10. The liquid flows from the second cell through pipe 11 into the third cell. Pipe 11 is U-shaped to lengthen the path of the liquid and to thereby diminish the electric shunt.

The treated liquid is discharged from the third cell through pipe 12 also located in a corner of the treatment cell.

Rinsing liquid is entered through pipe 14 and discharged through pipe 15; both pipes being locked in the corners of the outer quadrangular cathode chamber. It is advisable to lengthen the rinsing pipe by imparting to a portion 16 of the same a helical shape.

The important advantages obtained by the above described location and form of the insulated pipes are as follows:

By the mounting of the pipes in the corners of the outer quadrangular cathode chambers these pipes are protected from breakage and therefore may be made from easily breakable materials such as particularly glass.

Moreover, and in order not to impair the efficiency of the plant, the insulated tubes may be considerably elongated without interference in the available space. In accordance with this purpose, the pipes through which the liquids to be treated are introduced into the cells are provided with helical portions. For the same reason, the overflow pipes from one into an adjacent cell are bent into U-shapes. These means serve to reduce the electrical shunt.

Since certain changes may be made in the above article and different embodiments of the invention could be made without departing from the scope thereof, it is intended that all matter contained in the above description or shown in the accompanying drawing shall be interpreted as illustrative and not in a limiting sense.

I claim:

1. In an electro-osmotic cell for the purification of liquids an inner circular anode compartment, an outer quadrangular cathode compartment surrounding said inner circular compartment and a circular inter-electrode treatment chamber between said inner anode compartment and said outer cathode compartment, circular diaphragms separating said circular treatment chamber, said inner circular and said outer quadrangular compartment, a first insulating pipe helically formed on the greater part of its length located in a first corner of said cathode compartment and connected to the lower portion of said treatment chamber for the supply thereinto of the liquid to be purified, a second insulating pipe for the discharge of the liquid connected with the upper portion of said treatment chamber and a third insulating pipe located in a second corner of said cathode compartment and opening into the same for the supply of a rinsing fluid and a fourth insulating pipe in still another corner of said cathode compartment and opening into the same for the discharge of the rinsing fluid.

2. In a plant for the electro-osmotic purification of liquids, a plurality of electro-osmotic cells, each of said cells comprising an inner circular anode compartment, an outer quadrangular cathode compartment surrounding said inner circular compartment and a circular inter-electrode treatment chamber between said inner anode compartment and said outer cathode compartment, circular diaphragms separating said circular treatment chamber, said inner circular and said outer quadrangular compartment, a first insulating pipe helically formed on the greater part of its length located in a first corner of said cathode compartment and connected to the lower portion of said treatment chamber for the supply thereinto of the liquid to be purified, a second insulating pipe for the discharge of the liquid connected with the upper portion of said treatment chamber, a third insulating pipe located in a second corner of said cathode compartment and opening into the same for the supply of a rinsing fluid and a fourth insulating pipe in still another corner of said cathode compartment and opening into the same for the discharge of the rinsing fluid, overflow passages in the top portions of said cells and tubes connecting said overflow passages with the next cell, said tubes being U-shaped to lengthen the path of the liquid from one into the adjacent cell.

FEDERICO PAVELKA.

REFERENCES CITED

The following references are of record in the file of this patent:

UNITED STATES PATENTS

| Number | Name | Date |
|---|---|---|
| 718,249 | Haas | Jan. 13, 1903 |
| 1,901,652 | Kean | Mar. 14, 1933 |
| 2,093,770 | Billiter | Sept. 21, 1937 |
| 2,350,669 | Boller | June 6, 1940 |

FOREIGN PATENTS

| Number | Country | Date |
|---|---|---|
| 306,102 | Germany | June 18, 1918 |
| 186,264 | Switzerland | Dec. 1, 1936 |